US012656446B2

(12) United States Patent
Cordill

(10) Patent No.: US 12,656,446 B2
(45) Date of Patent: Jun. 16, 2026

(54) CELLULAR AIDED NAVIGATION

(71) Applicant: L3Harris Technologies, Inc.,
Melbourne, FL (US)

(72) Inventor: Brian Cordill, Plano, TX (US)

(73) Assignee: L3Harris Technologies, Inc.,
Melbourne, FL (US)

( * ) Notice: Subject to any disclaimer, the term of this
patent is extended or adjusted under 35
U.S.C. 154(b) by 327 days.

(21) Appl. No.: 18/176,830

(22) Filed: Mar. 1, 2023

(65) Prior Publication Data

US 2024/0295627 A1 Sep. 5, 2024

(51) Int. Cl.
*G01S 5/08* (2006.01)

(52) U.S. Cl.
CPC ........... *G01S 5/08* (2013.01); *G01S 2205/008*
(2013.01); *G01S 2205/03* (2020.05)

(58) Field of Classification Search
CPC ................... G01S 5/08; G01S 2205/03; G01S
2205/008; H04W 4/02–029
See application file for complete search history.

(56) References Cited

U.S. PATENT DOCUMENTS

| | | | | |
|---|---|---|---|---|
| 11,076,372 | B1 * | 7/2021 | Miranda ................. | H04W 4/40 |
| 2006/0239238 | A1 * | 10/2006 | Fernandez-Corbaton ................... | |
| | | | | H04W 52/325 |
| | | | | 370/342 |
| 2012/0081248 | A1 | 4/2012 | Kennedy et al. | |
| 2019/0104384 | A1 * | 4/2019 | Abou-Rizk ........... | G01S 1/0426 |
| 2021/0185536 | A1 * | 6/2021 | Agarwal ............... | H04W 48/16 |
| 2021/0255271 | A1 * | 8/2021 | Sheng ................... | G01S 5/0236 |
| 2024/0172169 | A1 * | 5/2024 | Yerramalli ............ | G01S 5/0205 |

FOREIGN PATENT DOCUMENTS

WO     WO-2024069617 A1 *   4/2024   .......... G01S 5/0072

OTHER PUBLICATIONS

V. Delafontaine, et al., "Drone-aided Localization in LoRa IoT
Networks", 2020 IEEE International Conference on Robotics and
Automation (ICRA). IEEE, 2020, 7 pages.
J. Raquet, et al., "Non-GNSS Radio Frequency Navigation", 2008
IEEE International Conference on Acoustics, Speech and Signal
Processing. IEEE, 2008, 5 pages.
J. Morales, et al., "Tightly Coupled Inertial Navigation System With
Signals of Opportunity Aiding", IEEE Transactions on Aerospace
and Electronic Systems, vol. 57, No. 3, pp. 1930-1948.

* cited by examiner

*Primary Examiner* — Cassi J Galt
(74) *Attorney, Agent, or Firm* — Edell, Shapiro & Finnan,
LLC

(57) ABSTRACT

Disclosed is a method including: determining a location of
each of a plurality of cellular base stations; receiving, at a
vehicle, a first signal transmitted by a first cellular base
station; receiving a second signal transmitted by a second
cellular base station; determining a first angle of arrival of
the first signal and a second angle of arrival of the second
signal; demodulating the first signal to determine a first
identity of the first cellular base station; demodulating the
second signal to determine a second identity of the second
cellular base station; determining a first location of the first
cellular base station based on the first identity; determining
a second location of the second cellular base station based on
the second identity; and determining a position and velocity
of the vehicle from the first location, the first angle of arrival,
the second location and the second angle of arrival.

16 Claims, 3 Drawing Sheets

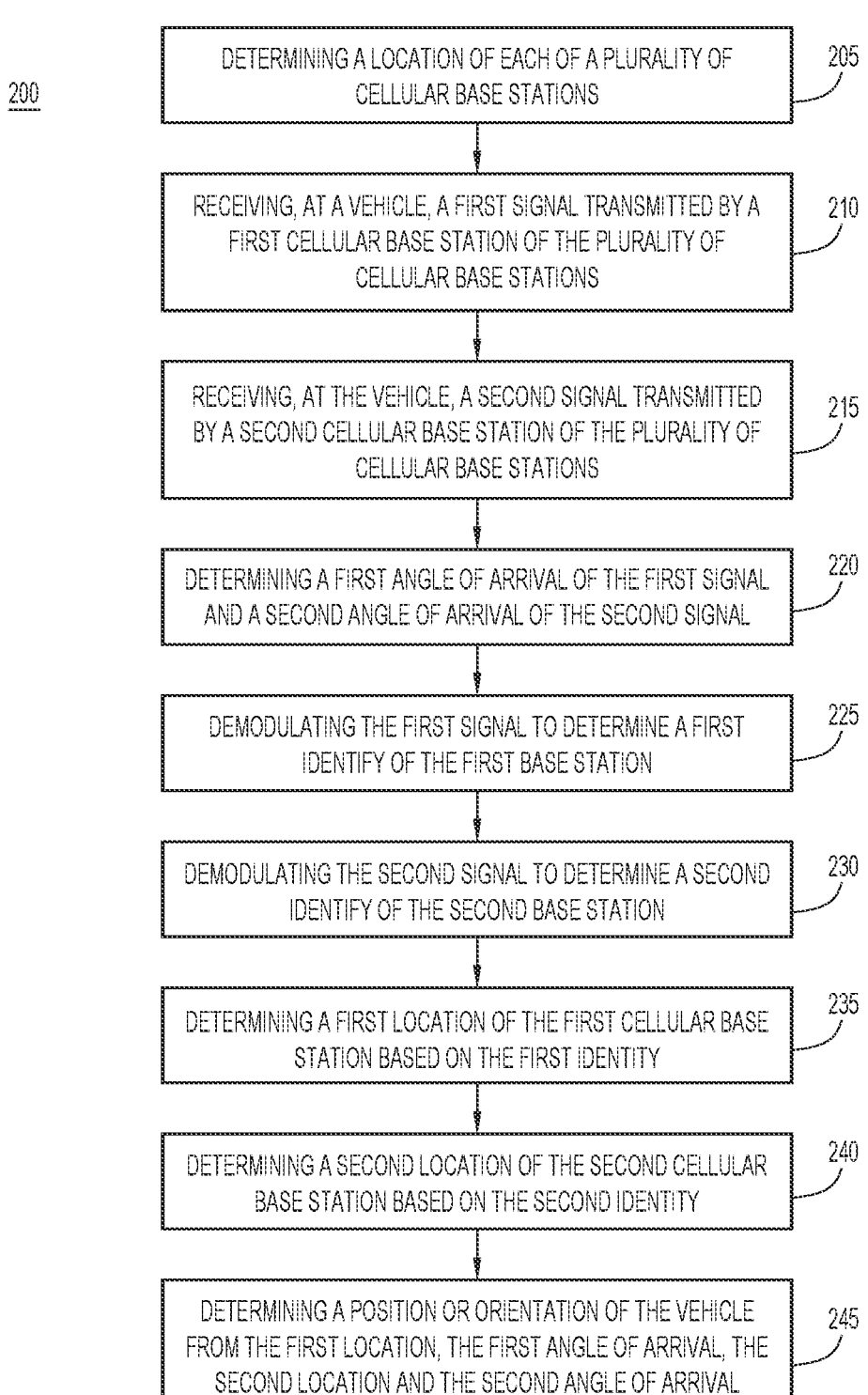

200

DETERMINING A LOCATION OF EACH OF A PLURALITY OF CELLULAR BASE STATIONS — 205

RECEIVING, AT A VEHICLE, A FIRST SIGNAL TRANSMITTED BY A FIRST CELLULAR BASE STATION OF THE PLURALITY OF CELLULAR BASE STATIONS — 210

RECEIVING, AT THE VEHICLE, A SECOND SIGNAL TRANSMITTED BY A SECOND CELLULAR BASE STATION OF THE PLURALITY OF CELLULAR BASE STATIONS — 215

DETERMINING A FIRST ANGLE OF ARRIVAL OF THE FIRST SIGNAL AND A SECOND ANGLE OF ARRIVAL OF THE SECOND SIGNAL — 220

DEMODULATING THE FIRST SIGNAL TO DETERMINE A FIRST IDENTIFY OF THE FIRST BASE STATION — 225

DEMODULATING THE SECOND SIGNAL TO DETERMINE A SECOND IDENTIFY OF THE SECOND BASE STATION — 230

DETERMINING A FIRST LOCATION OF THE FIRST CELLULAR BASE STATION BASED ON THE FIRST IDENTITY — 235

DETERMINING A SECOND LOCATION OF THE SECOND CELLULAR BASE STATION BASED ON THE SECOND IDENTITY — 240

DETERMINING A POSITION OR ORIENTATION OF THE VEHICLE FROM THE FIRST LOCATION, THE FIRST ANGLE OF ARRIVAL, THE SECOND LOCATION AND THE SECOND ANGLE OF ARRIVAL — 245

FIG.2

CELLULAR AIDED NAVIGATION

TECHNICAL FIELD

The present disclosure relates to navigation systems.

BACKGROUND

Aircraft generally use navigation systems that rely on satellites to provide geo-positioning data. The geo-positioning data allows aircraft to determine their location (longitude, latitude, and altitude/elevation) with high precision (within a few centimeters to meters). The geo-positioning data may be embodied as time signals transmitted along a line of sight using radio waves from the satellites.

BRIEF DESCRIPTION OF THE DRAWINGS

FIG. 2 illustrates a flowchart providing a generalized process flow for implementing the disclosed cellular aided navigation techniques, according to an example embodiment.

DETAILED DESCRIPTION

Overview

Figure 1:
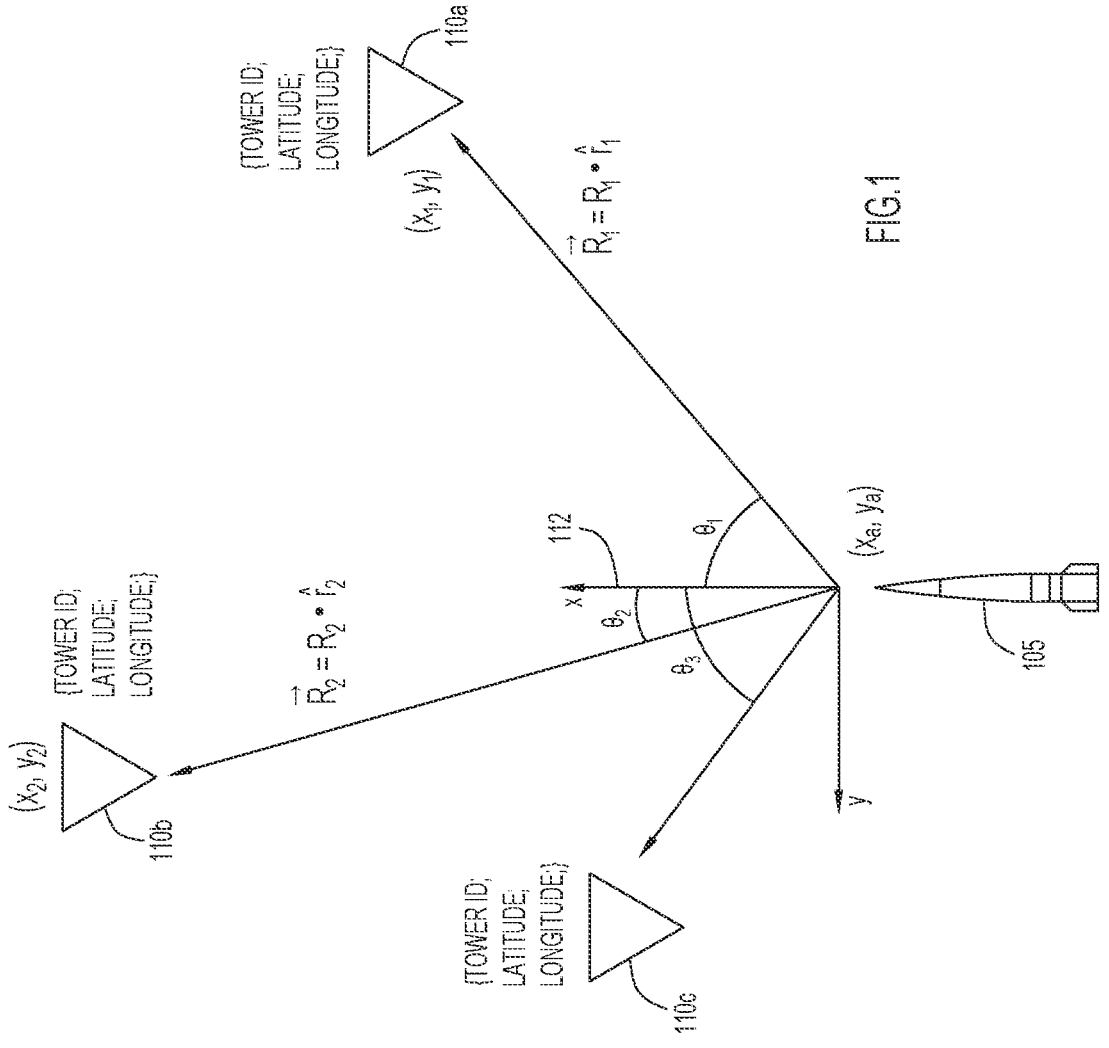
FIG. 1 is an illustration of the angle of arrival of cellular signals used in the cellular aided navigation techniques disclosed herein, according to an example embodiment.

The Global Positioning System (GPS) has been a foundational pillar of aircraft positioning, navigation and timing (PNT) for the last 40 years. Local area GPS jamming is, unfortunately, becoming pervasive, and theater wide jamming may be implemented in major conflicts. In fact, global disruption of GPS may become a real possibility. Current and future navigation systems (e.g., for aircraft as well as guided weapon systems) may need navigation solutions that are independent of GPS to remain effective.

Disclosed herein are techniques that exploit existing cellular base stations and their signals to assist or replace GPS navigation in the event GPS is jammed or otherwise disrupted. Accordingly, in some aspects, the techniques described herein relate to a method including: determining a location of each of a plurality of cellular base stations; receiving, at a vehicle, a first signal transmitted by a first cellular base station of the plurality of cellular base stations; receiving, at the vehicle, a second signal transmitted by a second cellular base station of the plurality of cellular base stations; determining a first angle of arrival of the first signal and a second angle of arrival of the second signal; demodulating the first signal to determine a first identity of the first cellular base station; demodulating the second signal to determine a second identity of the second cellular base station; determining a first location of the first cellular base station based on the first identity; determining a second location of the second cellular base station based on the second identity; and determining a position or orientation of the vehicle from the first location, the first angle of arrival, the second location and the second angle of arrival.

In some aspects, the techniques described herein relate to an apparatus including: one or more memories; an array of antenna elements arranged on a vehicle; and one or more processors, wherein the one or more processors are configured to: store, in the one or more memories, a location of each of a plurality of cellular base stations; receive, via the array of antenna elements, a first signal transmitted by a first cellular base station of the plurality of cellular base stations; receive, via the array of antenna elements, a second signal transmitted by a second cellular base station of the plurality of cellular base stations; determine a first angle of arrival of the first signal and a second angle of arrival of the second signal; demodulate the first signal to determine a first identity of the first cellular base station; demodulate the second signal to determine a second identity of the second cellular base station; determine a first location of the first cellular base station based on the first identity and the location of each of the plurality of cellular base stations stored in the one or more memories; determine a second location of the second cellular base station based on the second identity and the location of each of the plurality of cellular base stations stored in the one or more memories; and determine a position or orientation of the vehicle from the first location, the first angle of arrival, the second location and the second angle of arrival.

In some aspects, the techniques described herein relate to one or more tangible non-transitory computer readable mediums encoded with instructions, wherein the instructions are operable to cause one or more processors to: determine a location of each of a plurality of cellular base stations; receive, at a vehicle, a first signal transmitted by a first cellular base station of the plurality of cellular base stations; receive, at the vehicle, a second signal transmitted by a second cellular base station of the plurality of cellular base stations; determine a first angle of arrival of the first signal and a second angle of arrival of the second signal; demodulate the first signal to determine a first identity of the first cellular base station; demodulate the second signal to determine a second identity of the second cellular base station; determine a first location of the first cellular base station based on the first identity; determine a second location of the second cellular base station based on the second identity; and determine a position or orientation of the vehicle from the first location, the first angle of arrival, the second location and the second angle of arrival.

EXAMPLE EMBODIMENTS

The modern radio frequency (RF) spectrum is full of fixed broadcast stations that can serve as landmarks for a system in flight. One such example are mid-band Third Generation Partnership Project (3GPP) cellular towers or more accurately, cellular base stations. Specifically, Fourth Generation (4G) 3GPP Long Term Evolution (LTE) cellular base stations and Fifth Generation (5G) 3GPP cellular base stations are deployed at fixed locations, transmit with relatively high power, are designed to radiated power towards the horizon and are easy to identify in a crowded spectrum. The techniques disclosed herein leverage these aspects of cellular base stations to use the 5G base station signals as navigational broadcast beacons.

According to the disclosed techniques, vehicle orientation, location and velocity are determined using 5G base station signals. Specifically, 5G base station signals are received and demodulated at the vehicle, such as an aircraft. The angle of arrival (AoA) of the received RF signals are determined. From the demodulated RF signal, the source base station of the RF signal is determined. Once the source base station of the signal is determined, the location of the source is determined using a priori knowledge of the base station locations. Using the base station location information and the AoA signal information, the orientation, location and/or velocity of the vehicle may be determined.

According to specific example embodiments of the disclosed techniques, the mid-band segment of the 5G standard is utilized in the disclosed techniques. The mid-band segment, which operates in the 1-6 GHz range, may be particularly applicable to the disclosed techniques because the range of mid-band signals exhibits favorable long distance propagation characteristics. Furthermore, mid-band signals are often used for exurban locations. Because the mid-band range is used in exurban locations, it is often transmitted at high power and aimed towards the horizon.

5G base station signals may also be particularly applicable to the disclosed techniques because 5G base stations broadcast one or more unique base station identifiers. The broadcasting of the base station identifier(s) may eliminate the complexity that might otherwise be needed to identify the source of a particular signal. This reduced complexity may also reduce the size, weight and power requirements of the receiver of the 5G signals. Additionally, 5G base stations are long term installations—once they are installed they do not move, nor does their identifier change. Accordingly, there is time to generate a database of base station identifiers and corresponding locations that can be relatively easily maintained.

Turning to FIG. 1, depicted therein is an example of how cellular base station signals may be combined with angle of arrival measurements made by the radar in a passive receive mode to estimate the radar platform's location. For clarity, it is noted that the example of FIG. 1 will be described with reference to a "radar." However, the techniques may be implemented through any device configured to receive and measure the relevant cellular base station signals. The receiver does not need to be capable of, for example, actively transmitting RF signals.

Illustrated in FIG. 1 is an aircraft 105 and three 5G cellular base stations 110*a-c*. Aircraft 105 is illustrated as a missile or rocket. However, the techniques disclosed herein are applicable to other types of vehicles and aircraft, including cars, trucks, airplanes, helicopters, unmanned aerial vehicles, and other land and air vehicles known to the skilled artisan. As illustrated in FIG. 1, a direction or angle of arrival (AoA) $\theta_1$ is measured for signals transmitted by cellular base station 110*a*, an AoA $\theta_2$ is measured for signals transmitted by cellular base station 110*b*, and an AoA $\theta_3$ is measured for signals transmitted by cellular base station 110*c*. If the signals from each of cellular base stations 110*a-c* can be distinguished in the RF spectrum, and the locations of these base stations are precisely known, then the AoA measurements $\theta_1$, $\theta_2$, and $\theta_3$ may be used by aircraft 105, or a device communicatively coupled to aircraft 105, to determine the location of aircraft 105.

According to the disclosed techniques, the determination of AoA measurements $\theta_1$, $\theta_2$, and $\theta_3$ may be performed using any technique known to the skilled artisan. For example, the AoA measurements $\theta_1$, $\theta_2$, and $\theta_3$ may be determined by the direction of propagation of an RF wave incident on an antenna array or determined from the maximum measured signal strength during antenna rotation. The AoA measurements $\theta_1$, $\theta_2$, and $\theta_3$ may also be calculated by measuring the time difference of arrival (TDOA) between individual elements of the array. Consider the simplified example of a two element antenna array in which the elements are spaced apart by one-half wavelength of an incoming RF signal transmitted from a cellular base station, such as one of cellular base stations 110*a-c*. If the signal is incident upon the two-element array at boresight 112, it will arrive at both antenna elements simultaneously. Because the signal is received at the two elements at the same time, a 0° phase-difference will be measured between the two antenna elements, which may be interpreted as a 0° AoA for the signal relative to the antenna array. If the incoming RF signal is incident upon the array at broadside, then a 1800 phase difference will be measured between the two antenna elements, which may be interpreted as a 90° AoA. Using antenna arrays with a larger number of antenna elements, arranged more closely together, more precise and more granular AoA measurements may be determined.

Once the AoA measurements $\theta_1$, $\theta_2$, and $\theta_3$ are determined, this information may be used in conjunction with the known locations of cellular base stations 110*a-c* to determine the location and/or orientation of aircraft 105.

A simplified example calculation will now be described with reference to aircraft 105 of FIG. 1 in which the location of aircraft 105 is determined from the signals broadcast by base stations 110*a* and 110*b*. For purposes of this example, aircraft 105 is positioned at the origin of a cartesian coordinate system with the x-axis aligned with boresight 112 and the y-axis being perpendicular thereto. To form a right hand coordinate system, positive x values increase as one moves towards the top of the figure and positive y values increase as one moves towards the left hand side of the figure. Aircraft 105 has been placed at the origin of the coordinate system to simply the expressions used in this calculation. However, the location of aircraft 105 would not be known ahead of time in a real world implementation of the techniques disclosed herein.

The calculation begins when the broadcast signals from base stations 110*a* and 110*b* are isolated and demodulated. A base station identifier for each of base stations 110*a* and 110*b* is determined from the signals, and a location for each of the base stations 110*a* and 110*b* is determined using identifiers.

In addition to being used to determine the identifiers associated with base stations 110*a* and 110*b*, the broadcast signals are also used to determine the AoA measurements $\theta_1$ and $\theta_2$. For example, $\theta_1$ and $\theta_2$ may be determined by the direction of propagation of an RF wave incident on an antenna array associated with aircraft 105, determined from the maximum measured signal strength during antenna rotation, or determined by measuring the TDOA between individual elements of an array antenna array associated with aircraft 105. Based upon the AoA measurements, respective unit line of sight vectors to each of the two base stations 110*a* and 110*b* are determined as follows:

$$\hat{r}_1 = (\cos \theta_1, \sin \theta_1); \tag{1}$$

$$\hat{r}_2 = (\cos \theta_2, \sin \theta_2); \tag{2}$$

where $\hat{r}_1$ is the unit line of sight vector to base station 110*a* and $\hat{r}_2$ is the unit line of sight vector to base station 110*b*. A set of linear equations may then be determined as follows:

$$\begin{aligned} x_1 &= x_a + R_1 \cdot \cos \theta_1 \\ x_2 &= x_a + R_2 \cdot \cos \theta_2 \\ y_1 &= y_a + R_1 \cdot \sin \theta_1 \\ y_2 &= y_a + R_1 \cdot \sin \theta_2 \end{aligned} \tag{3}$$

where $R_1$ is the distance along $\hat{r}_1$ to base station 110a, $R_2$ is the distance along $\hat{r}_2$ to base station 110b, $x_1$ and $y_1$ are the coordinates of base station 110a, $x_2$ and $y_2$ are the coordinates of base station 110b, and $x_a$ and $y_a$ are the coordinates of aircraft 105. As noted above, for purposes of this calculation aircraft 105 is located at the origin of the coordinate system. However, in a real world calculation those values may not be known a priori.

This set of linear equations may be rewritten using matrix notation as follows:

$$\begin{bmatrix} x_1 \\ x_2 \\ y_1 \\ y_2 \end{bmatrix} = \begin{bmatrix} 1 & \cos\theta_1 & 0 & 0 \\ 1 & 0 & \cos\theta_2 & 0 \\ 0 & \sin\theta_1 & 0 & 1 \\ 0 & 0 & \sin\theta_2 & 1 \end{bmatrix} \begin{bmatrix} x_a \\ R_1 \\ R_2 \\ y_a \end{bmatrix}. \quad (4)$$

Finally, the values for $R_1$, $R_2$, $x_a$ and $y_a$ may be solved for using conventional linear algebra methods, such as:

$$\begin{bmatrix} 1 & \cos\theta_1 & 0 & 0 \\ 1 & 0 & \cos\theta_2 & 0 \\ 0 & \sin\theta_1 & 0 & 1 \\ 0 & 0 & \sin\theta_2 & 1 \end{bmatrix}^{-1} \cdot \begin{bmatrix} x_1 \\ x_2 \\ y_1 \\ y_2 \end{bmatrix} = \begin{bmatrix} x_a \\ R_1 \\ R_2 \\ y_a \end{bmatrix}. \quad (5)$$

The above-described calculation was performed using two AoA values, $\theta_1$ and $\theta_2$, for two different base station locations, respectively. However, the calculations may be performed using a smaller or greater number of AoA angles and respective base station locations. Additionally, the above-described position calculation may be performed at two more different times. Based on such a plurality of position calculations, a velocity of the aircraft may be determined.

As illustrated through the calculations described above, a perquisite for performing the calculations is the ability to uniquely identify the base station associated with a particular signal and have a priori knowledge of base station's location. 5G base stations broadcast a unique base station identifier as part of the Synchronization Signal Block (SSB) of the 5G standard. Specifically, included in the SSB is Physical Cell Identifier (PCI). When a user equipment device (e.g., cellular phones or other cellular equipped processing devices) is powered on or when it accesses a new base station, the user equipment device synchronizes to the base station. The SSB broadcast by the base station allows a user equipment to device to perform this synchronization. Specifically, the SSB includes a Primary Synchronization Signal (PSS) and a Secondary Synchronization Signal (SSS). From the PSS and the SSS the user equipment device is able to determine the PCI. While the PCI is not universally unique, there are about 1000 different unique PCI values, the PCI is sufficient to uniquely identify the base station within the line of sight of a particular user equipment device, including a device arranged on an aircraft or another vehicle as described above. The PCI is a particular good identifier for use in the techniques disclosed herein because it is relatively fast and easy to decode. The location of the source of the PCI may then be determined by applying the PCI of the source of the signal against a database of base station locations limited to the general region of the aircraft.

Cell phone base stations may also broadcast another unique base station identifier, the Cell Global Identifier (CGI), as part of their air interface standard. Cellular base stations operating under the 5G standard transmit periodic frames known as information blocks which contain information that allows user equipment to access the base station. One such information block is the System Information Block #1 or "SIB1." The SIB1 contains numerous types of data, including, for example:

Cell Selection Information;
Cell Access Related Information;
Connection Establishment Failure Control Information;
System Information Scheduling Data;
Serving Cell Common Configuration Information;
Incident Management System (IMS) Emergency Support Flags; and
User Equipment Timer and Constants Information, among others.

Included in the cell access related information is the CGI. Accordingly, by demodulating the SIB1 and determining the CGI contained therein, a base station's identity may be determined. The receipt and demodulation of the SIB1 does not require the aircraft to connect to the 5G network or otherwise communicate with the 5G base stations. The SIB1 information block is part of a beacon signal that may be passively received by any receiver configured to receive signals at the appropriate frequency. The location of the source of the 5G signal may then be determined by applying the CGI of the source of the signal against a database of base station locations. While it may be more difficult and time consuming to determine the CGI instead of the PCI (e.g., a user equipment device decodes the SSB containing the PCI before decoding the SiB1 containing the CGI), the CGI provides the benefit of being universally unique.

Turning to FIG. 2, depicted therein is flowchart 200 providing a generalized process flow for implementing the techniques of this disclosure.

Flowchart 200 begins in operation 205 where a location is determined for each of a plurality of cellular base stations. As described above, the locations for cellular base stations are generally known through, for example, crowd sourcing initiatives. Accordingly, operation 205 may be embodied as the acquiring and storing or curating of such crowd sourced information. According to other embodiments, an organization, such as a governmental or corporate organization, may undertake an initiative to acquire accurate locations for a plurality of relevant cellular base stations. Operation 205 may also be embodied as a combination of crowd sourced and organization-specific cellular base station location data.

Next, in operation 210, a first signal transmitted by a first cellular base station of the plurality of cellular base stations is received at a vehicle. As described above, operation 210 may be embodied as the vehicle receiving a cellular transmission, such as a cellular information block.

Similarly, a second signal transmitted by a second cellular base station of the plurality of cellular base stations is received at the vehicle in operation 215. As described above, operation 215 may be embodied as the vehicle receiving a cellular transmission, such as a cellular information block.

In operation 220 a first angle of arrival is determined for the first signal and a second angle of arrival is determined for the second signal. As described above, the first and second angle of arrivals may be determined based upon any technique known to the skilled artisan. For example, the first and second angles of arrival may be determined by the direction of propagation of the first and second signals being incident on an antenna array, determined from the maximum measured signal strength for the first and second signals during antenna rotation, or measuring the TDOA between individual elements of the array for the first and second signals.

In operation 225, the first signal is demodulated to determine a first identity of the first cellular base station, and in operation 230, the second signal is demodulated to determine a second identity of the second cellular base station. As described above, the demodulations of operations 225 and 230 may include demodulating the first and second signals to determine the data contained in an information block, such as the SIB1 information block. Once demodulated, a cellular base station identifier, such as the CGI, may be determined for the first cellular base station and the second cellular base station, respectively.

In operation 235, a first location of the first cellular base station is determined based on the first identity, and in operation 240, a second location of the second cellular base station is determined based on the second identity. For example, the first and second identities determined in operations 225 and 230, respectively, may be used to query the locations for the plurality of cellular base stations determined in operation 205.

Finally, in operation 245 a position or orientation of the vehicle is determined from the first location, the first angle of arrival, the second location and the second angle of arrival. Other embodiments may use more or fewer numbers of AoA and location values without deviating from the disclosed techniques. Furthermore, the two or more location calculations may be performed at different times to determine a velocity of the vehicle.

Figure 3:
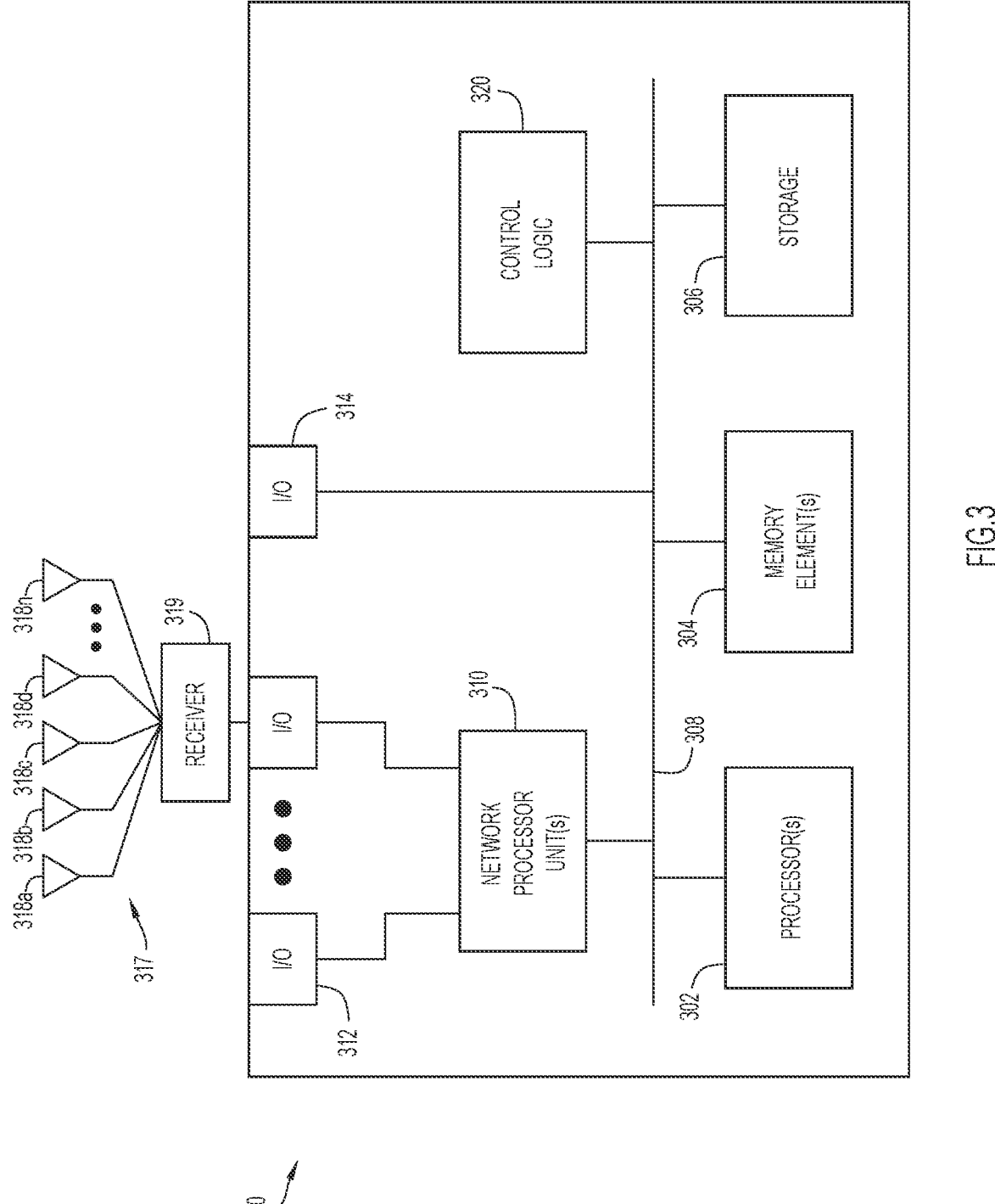
FIG. 3 provides a functional block diagram of an apparatus configured to implement the disclosed cellular aided navigation techniques, according to an example embodiment.

Referring to FIG. 3, FIG. 3 illustrates a hardware block diagram of an apparatus 300 that may perform functions associated with operations discussed herein in connection with the techniques depicted in FIGS. 1 and 2. In various embodiments, a computing device or apparatus, such as apparatus 300 or any combination of computing devices 300, may be configured as any entity/entities as discussed for the techniques depicted in connection with FIGS. 1 and 2 in order to perform operations of the various techniques discussed herein.

In at least one embodiment, the computing device 300 may be any apparatus that may include one or more processor(s) 302, one or more memory element(s) 304, storage 306, a bus 308, one or more processor unit(s) 310 interconnected with one or more network input/output (I/O) interface(s) 312, one or more I/O interface(s) 314, and control logic 320. In various embodiments, instructions associated with logic for computing device 300 can overlap in any manner and are not limited to the specific allocation of instructions and/or operations described herein.

In at least one embodiment, processor(s) 302 is/are at least one hardware processor configured to execute various tasks, operations and/or functions for computing device 300 as described herein according to software and/or instructions configured for computing device 300. Processor(s) 302 (e.g., a hardware processor) can execute any type of instructions associated with data to achieve the operations detailed herein. In one example, processor(s) 302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 304 and/or storage 306 is/are configured to store data, information, software, and/or instructions associated with computing device 300, and/or logic configured for memory element(s) 304 and/or storage 306. For example, any logic described herein (e.g., control logic 320) can, in various embodiments, be stored for computing device 300 using any combination of memory element(s) 304 and/or storage 306. Note that in some embodiments, storage 306 can be consolidated with memory element(s) 304 (or vice versa), or can overlap/exist in any other suitable manner.

In at least one embodiment, bus 308 can be configured as an interface that enables one or more elements of computing device 300 to communicate in order to exchange information and/or data. Bus 308 can be implemented with any architecture designed for passing control, data and/or information between processors, memory elements/storage, peripheral devices, and/or any other hardware and/or software components that may be configured for computing device 300. In at least one embodiment, bus 308 may be implemented as a fast kernel-hosted interconnect, potentially using shared memory between processes (e.g., logic), which can enable efficient communication paths between the processes.

In various embodiments, processor unit(s) 310 may enable communication between computing device 300 and other systems, entities, etc., via network I/O interface(s) 312 (wired and/or wireless). In various embodiments, network I/O interface(s) 312 can be configured as one or more Ethernet port(s), Fibre Channel ports, any other I/O port(s), and/or antenna(s)/antenna array(s) now known or hereafter developed. Thus, the processor unit(s) 310 and/or network I/O interface(s) 312 may include suitable interfaces for receiving, transmitting, and/or otherwise communicating data and/or information in a network environment.

Connected through I/O interface 312 is antenna array 317 that allows processor unit(s) 310 to serve as a controller device for antenna array 317. Included in antenna array 317 are a plurality of antenna elements 318a-n. As understood by the skilled artisan, the physical characteristics (e.g., length, width, area, etc.) dictate the ability of an antenna element to send and receive signals at a particular frequency with a particular bandwidth. Accordingly, antenna elements 318a-n may be physically configured to receive cellular signals with sufficient bandwidth to implement the disclosed techniques. According to specific example embodiments, antenna elements 318a-n are configured to receive 5G signals, and in particular, 5G mid-band signals. Each of antenna elements 318a-n may be configured with a phase shifter that enables the antenna array to transmit signals at different directions relative to antenna array 317. The phase shifters may also be used in the above-described AoA measurement techniques.

Antenna elements 318a-n are not limited to any particular type of antenna element. Accordingly, antenna elements may be embodied as horn antenna elements, monopole antenna elements, dipole antenna elements, helical antenna elements, patch antenna elements, slot antenna elements, Vivaldi antenna elements, Yagi-Uda antenna elements, fractal antenna elements, and others known to the skilled artisan.

The signals incident at antenna elements 318a-n are received by receiver 319. According to example embodiments in which apparatus 300 is configured to transmit as well as receive signals via antenna elements 318a-n, receiver 319 may be the receiver functionality of a transceiver. Receiver 319 may be configured to receive the signals from antenna elements 318a-n and provide the received signals to processor unit(s) 310 as one or more digital signals. Receiver 319 may be configured to implement the AoA determination techniques described above. According to such embodiments, receiver 319 may provide a single signal to processor unit(s) 310 for each cellular base station signal that includes an indication of the signals angle of arrival.

According to other example embodiments, receiver 319 may provide the individual signals from antenna elements 318*a-n* to processor unit(s) 310 to allow processor unit(s) 310 to implement the above-described AoA measurement techniques.

I/O interface(s) 314 allow for input and output of data and/or information with other entities that may be connected to computing device 300. Additional I/O interface(s) 314 may provide connections to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

Antenna array 317 is illustrated in FIG. 3 as being connected to processor unit(s) 310 via I/O interface(s) 312. However, antenna array 317 may also be connected to processor unit(s) 310 via I/O interface(s) 314 and bus 308.

In various embodiments, control logic 320 can include instructions that, when executed, cause processor(s) 302 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof, and/or the like to facilitate various operations for embodiments described herein.

The programs described herein (e.g., control logic 320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 304 and/or storage 306 can store data, software, code, instructions (e.g., processor instructions), logic, parameters, combinations thereof, and/or the like used for operations described herein. This includes memory element(s) 304 and/or storage 306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, provided for herein are techniques that may exploit existing cellular base stations and their signals to, for example, assist or replace GPS navigation in the event GPS is jammed or otherwise disrupted. Accordingly, in some aspects, the techniques described herein relate to a method including: determining a location of each of a plurality of cellular base stations; receiving, at a vehicle, a first signal transmitted by a first cellular base station of the plurality of cellular base stations; receiving, at the vehicle, a second signal transmitted by a second cellular base station of the plurality of cellular base stations; determining a first angle of arrival of the first signal and a second angle of arrival of the second signal; demodulating the first signal to determine a first identity of the first cellular base station; demodulating the second signal to determine a second identity of the second cellular base station; determining a first location of the first cellular base station based on the first identity; determining a second location of the second cellular base station based on the second identity; and determining a position or orientation of the vehicle from the first location, the first angle of arrival, the second location and the second angle of arrival.

In some aspects, the techniques described herein relate to a method, wherein receiving the first signal includes receiving a Fifth Generation Third Generation Partnership Project signal.

In some aspects, the techniques described herein relate to a method, wherein demodulating the first signal to determine the first identity includes determining the first identity from a system information block of the first signal.

In some aspects, the techniques described herein relate to a method, wherein demodulating the first signal to determine the first identity includes determining the first identity from a synchronization block of the first signal.

In some aspects, the techniques described herein relate to a method, further includes determining a second position of the vehicles; and determining a velocity of the vehicle from the position of the vehicle and the second position of the vehicle.

In some aspects, the techniques described herein relate to a method, wherein receiving the first signal includes receiving the first signal at an array of antenna elements.

In some aspects, the techniques described herein relate to a method, wherein determining the first angle of arrival of the first signal includes measuring a time difference of arrival of the first signal between individual elements of the array of antennas.

In some aspects, the techniques described herein relate to an apparatus including: one or more memories; an array of antenna elements arranged on a vehicle; and one or more processors, wherein the one or more processors are configured to: store, in the one or more memories, a location of each of a plurality of cellular base stations; receive, via the array of antenna elements, a first signal transmitted by a first cellular base station of the plurality of cellular base stations; receive, via the array of antenna elements, a second signal transmitted by a second cellular base station of the plurality of cellular base stations; determine a first angle of arrival of the first signal and a second angle of arrival of the second signal; demodulate the first signal to determine a first identity of the first cellular base station; demodulate the second signal to determine a second identity of the second cellular base station; determine a first location of the first cellular base station based on the first identity and the location of each of the plurality of cellular base stations stored in the one or more memories; determine a second location of the second cellular base station based on the second identity and the location of each of the plurality of cellular base stations stored in the one or more memories; and determine a position or orientation of the vehicle from the first location, the first angle of arrival, the second location and the second angle of arrival.

In some aspects, the techniques described herein relate to an apparatus, wherein the one or more processors are configured to receive the first signal by receiving a 5th Generation 3rd Generation Partnership Project signal.

In some aspects, the techniques described herein relate to an apparatus, wherein the one or more processors are configured to demodulate the first signal to determine the first identity by determining the first identity from a system information block of the first signal.

In some aspects, the techniques described herein relate to an apparatus, wherein the one or more processors are configured to demodulate the first signal to determine the first identity by determining the first identity from a synchronization block of the first signal.

In some aspects, the techniques described herein relate to an apparatus, wherein the one or more processors are configured to receive the first signal by receiving a 5th Generation 3rd Generation Partnership Project mid-band signal.

In some aspects, the techniques described herein relate to an apparatus, wherein the one or more processors are configured to determine the first angle of arrival of the first signal by measuring a time difference of arrival of the first signal between individual elements of the array of antennas.

In some aspects, the techniques described herein relate to one or more tangible non-transitory computer readable mediums encoded with instructions, wherein the instructions are operable to cause one or more processors to: determine a location of each of a plurality of cellular base stations; receive, at a vehicle, a first signal transmitted by a first cellular base station of the plurality of cellular base stations; receive, at the vehicle, a second signal transmitted by a second cellular base station of the plurality of cellular base stations; determine a first angle of arrival of the first signal and a second angle of arrival of the second signal; demodulate the first signal to determine a first identity of the first cellular base station; demodulate the second signal to determine a second identity of the second cellular base station; determine a first location of the first cellular base station based on the first identity; determine a second location of the second cellular base station based on the second identity; and determine a position or orientation of the vehicle from the first location, the first angle of arrival, the second location and the second angle of arrival.

In some aspects, the techniques described herein relate to one or more tangible non-transitory computer readable mediums, wherein the instructions operable to receive the first signal includes instructions operable to receive a 5th Generation 3rd Generation Partnership Project signal.

In some aspects, the techniques described herein relate to one or more tangible non-transitory computer readable mediums, wherein the instructions operable to demodulate the first signal to determine the first identity include instructions operable to determine the first identity from a system information block of the first signal.

In some aspects, the techniques described herein relate to one or more tangible non-transitory computer readable mediums, wherein the instructions operable to demodulate the first signal to determine the first identity include instructions operable to determine the first identity from a synchronization block of the first signal.

In some aspects, the techniques described herein relate to one or more tangible non-transitory computer readable mediums, wherein the instructions operable to receive the first signal includes instructions operable to receive a 5th Generation 3rd Generation Partnership Project mid-band signal.

In some aspects, the techniques described herein relate to one or more tangible non-transitory computer readable mediums, wherein the instructions operable to receive the first signal include instructions operable to receive the first signal at an array of antenna elements.

In some aspects, the techniques described herein relate to one or more tangible non-transitory computer readable mediums, wherein the instructions operable to determine the first angle of arrival of the first signal include instructions operable to measure a time difference of arrival of the first signal between individual elements of the array of antennas.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:

storing, in a database at a vehicle, data indicating locations associated with Physical Cell Identifiers;

receiving, at the vehicle, a first Fifth Generation Third Generation Partnership Project signal transmitted by a first cellular base station, wherein the signals are received at the vehicle via a transceiver that is not configured to form Third Generation Partnership Project connections;

receiving, at the vehicle, a second Fifth Generation Third Generation Partnership Project signal transmitted by a second cellular base station;

determining a first angle of arrival of the first Fifth Generation Third Generation Partnership Project signal and a second angle of arrival of the second Fifth Generation Third Generation Partnership Project signal;

demodulating the first Fifth Generation Third Generation Partnership Project signal to determine a first Physical Cell Identifier of the first cellular base station;

demodulating the second Fifth Generation Third Generation Partnership Project signal to determine a second Physical Cell Identifier of the second cellular base station;

determining, from the database, a first location of the first cellular base station based on the first Physical Cell Identifier;

determining, from the database, a second location of the second cellular base station based on the second Physical Cell Identifier; and determining a position or orientation of the vehicle from the first location, the first angle of arrival, the second location and the second angle of arrival without connecting or transmitting to the first cellular base station and without connecting or transmitting to the second cellular base station.

2. The method of claim 1, wherein demodulating the first Fifth Generation Third Generation Partnership Project signal to determine the first Physical Cell Identifier comprises determining the first Physical Cell Identifier from a Synchronization Signal Block of the first Fifth Generation Third Generation Partnership Project signal.

3. The method of claim 1, further comprises determining a second position of the vehicle; and determining a velocity of the vehicle from the position of the vehicle and the second position of the vehicle.

4. The method of claim 1, wherein receiving the first Fifth Generation Third Generation Partnership Project signal comprises receiving the first Fifth Generation Third Generation Partnership Project signal at an array of antenna elements.

5. The method of claim 4, wherein determining the first angle of arrival of the first Fifth Generation Third Generation Partnership Project signal comprises measuring a time difference of arrival of the first Fifth Generation Third Generation Partnership Project signal between individual elements of the array of antennas.

6. An apparatus comprising:

one or more memories of a vehicle;

an array of antenna elements arranged on the vehicle; and one or more processors of the vehicle, wherein the one or more processors are configured to:

store, in the one or more memories, a database containing data indicating locations associated with Physical Cell Identifiers;

receive, via the array of antenna elements, first data indicative of a first Fifth Generation Third Generation Partnership Project signal transmitted by a first cellular base station, wherein the signals are received at the vehicle via a transceiver that is not configured to form Third Generation Partnership Project connections;

receive, via the array of antenna elements, second data indicative of a second Fifth Generation Third Generation Partnership Project signal transmitted by a second cellular base station;

determine a first angle of arrival of the first Fifth Generation Third Generation Partnership Project signal and a second angle of arrival of the second Fifth Generation Third Generation Partnership Project signal;

demodulate the first data indicative of the first Fifth Generation Third Generation Partnership Project signal to determine a first Physical Cell Identifier of the first cellular base station;

demodulate the second data indicative of the second Fifth Generation Third Generation Partnership Project signal to determine a second Physical Cell Identifier of the second cellular base station;

determine, from the database, a first location of the first cellular base station based on the first Physical Cell Identifier;

determine, from the database, a second location of the second cellular base station based on the second Physical Cell Identifier; and determine a position or orientation of the vehicle from the first location, the first angle of arrival, the second location and the second angle of arrival without connecting or transmitting to the first cellular base station and without connecting or transmitting to the second cellular base station.

7. The apparatus of claim 6, wherein the one or more processors are configured to demodulate the first Fifth Generation Third Generation Partnership Project signal to determine the first Physical Cell Identifier by determining the first Physical Cell Identifier from a Synchronization Signal Block of the first Fifth Generation Third Generation Partnership Project signal.

8. The apparatus of claim 6, wherein the one or more processors are configured to receive the first Fifth Generation Third Generation Partnership Project signal by receiving a $5^{th}$ Generation $3^{rd}$ Generation Partnership Project mid-band signal.

9. The apparatus of claim 6, wherein the one or more processors are configured to determine the first angle of arrival of the first Fifth Generation Third Generation Partnership Project signal by measuring a time difference of arrival of the first Fifth Generation Third Generation Partnership Project signal between individual elements of the array of antennas.

10. The apparatus of claim 6, wherein the one or more processors are further configured to:

determine a second position of the vehicle; and determine a velocity of the vehicle from the position of the vehicle and the second position of the vehicle.

11. One or more tangible non-transitory computer readable mediums encoded with instructions, wherein the instructions are operable to cause one or more processors to:

store, in a database at a vehicle, data indicating locations associated with Physical Cell Identifiers;

receive, at the vehicle, first data indicative of a first Fifth Generation Third Generation Partnership Project signal transmitted by a first cellular base station and received at the vehicle, wherein the signals are received at the vehicle via a transceiver that is not configured to form Third Generation Partnership Project connections;

receive, at the vehicle, second data indicative of a second Fifth Generation Third Generation Partnership Project signal transmitted by a second cellular base station and received at the vehicle;

determine, from the first data, a first angle of arrival of the first Fifth Generation Third Generation Partnership Project signal;

determine, from the second data, a second angle of arrival of the second Fifth Generation Third Generation Partnership Project signal;

demodulate the first data indicative of the first Fifth Generation Third Generation Partnership Project signal to determine a first Physical Cell Identifier of the first cellular base station;

demodulate the second data indicative of the second Fifth Generation Third Generation Partnership Project signal to determine a second Physical Cell Identifier of the second cellular base station;

determine, from the database, a first location of the first cellular base station based on the first Physical Cell Identifier;

determine, from the database, a second location of the second cellular base station based on the second Physical Cell Identifier; and determine a position or orientation of the vehicle from the first location, the first angle of arrival, the second location and the second angle of arrival without connecting or transmitting to the first cellular base station and without connecting or transmitting to the second cellular base station.

12. The one or more tangible non-transitory computer readable mediums of claim 11, wherein the instructions operable to demodulate the first data indicative of the first Fifth Generation Third Generation Partnership Project signal to determine the first Physical Cell Identifier comprise instructions operable to determine the first Physical Cell Identifier from a Synchronization Signal Block of the first Fifth Generation Third Generation Partnership Project signal.

13. The one or more tangible non-transitory computer readable mediums of claim 11, wherein the instructions operable to receive the first data indicative of the first Fifth Generation Third Generation Partnership Project signal comprises instructions operable to receive a $5^{th}$ Generation $3^{rd}$ Generation Partnership Project mid-band signal.

14. The one or more tangible non-transitory computer readable mediums of claim 11, wherein the instructions operable to receive the first data indicative of the first Fifth Generation Third Generation Partnership Project signal comprise instructions operable to receive the first Fifth Generation Third Generation Partnership Project signal at an array of antenna elements.

15. The one or more tangible non-transitory computer readable mediums of claim 14, wherein the instructions operable to determine the first angle of arrival of the first Fifth Generation Third Generation Partnership Project signal comprise instructions operable to measure a time difference of arrival of the first Fifth Generation Third Generation Partnership Project signal between individual elements of the array of antennas.

16. The one or more tangible non-transitory computer readable mediums of claim 11, wherein the instructions further comprises instruction operable to:

determine a second position of the vehicle; and
    determine a velocity of the vehicle from the position of the vehicle and the second position of the vehicle.

* * * * *